United States Patent [19]

Maag et al.

[11] Patent Number: 5,942,596
[45] Date of Patent: Aug. 24, 1999

[54] PROCESS FOR THE PRODUCTION OF CLEAR COPOLYESTERS OF TEREPHTHALIC ACID, NAPTHALENEDICARBOXYLIC ACID AND ETHYLENE GLYCOL

[75] Inventors: Maureen Clare Maag; David Taylor Bowers; Robert Lewis Stoots, Jr., all of Kingsport, Tenn.

[73] Assignee: Eastman Chemical Company, Kingsport, Tenn.

[21] Appl. No.: 09/028,834

[22] Filed: Feb. 24, 1998

Related U.S. Application Data

[60] Provisional application No. 60/039,474, Feb. 27, 1997.
[51] Int. Cl.$^6$ ..................................................... C08G 63/68
[52] U.S. Cl. ........................... 528/287; 528/275; 528/298; 528/302; 528/308; 528/308.6
[58] Field of Search ..................................... 528/275, 287, 528/298, 302, 308, 308.6

[56] References Cited

U.S. PATENT DOCUMENTS 4,454,312   6/1984   Kuze et al. ............................. 528/275
5,017,680   5/1991   Sublett .
5,321,074   6/1994   Trotter et al. .

OTHER PUBLICATIONS

File WPI, Derwent accession No. 98–103918, Nippon Ester Co Ltd: "Polyester copolymer preparation, used in bottles, films, etc.—comprises adding di; alkyl 2,6–naphthalene di:carboxylate and ethylene glycol to bis(beta–hydroxy-ethyl) terephthalate, transesterifying in presence of titanium compound or tin compound, etc;" & JP,A,9221541, 970826, DW9810.

*Primary Examiner*—Sam A. Acquah
*Attorney, Agent, or Firm*—Karen A. Harding; Harry J. Gwinnell

[57] ABSTRACT

The present invention relates to a process comprising polymerizing repeat units derived from an acid component comprising terephthalic acid and naphthalenedicarboxylic acid and at least one glycol in the presence of less than about 10 ppm sodium carbonate and between about 10 and about 60 ppm phosphorus. Polyesters formed via the process of the present invention display surprisingly good clarity and color.

5 Claims, No Drawings

PROCESS FOR THE PRODUCTION OF CLEAR COPOLYESTERS OF TEREPHTHALIC ACID, NAPTHALENEDICARBOXYLIC ACID AND ETHYLENE GLYCOL

RELATED APPLICATION

This application claims the benefit of provisional application U.S. Ser. No. 60/039,474 filed Feb. 27, 1997.

FIELD OF THE INVENTION

The present invention relates to a process for the production of clear copolyesters comprising repeat units derived from terephthalic acid, ethylene glycol and 5–20 mole % napthalenedicarboxylic acid. Other comonomers in minor amounts may also be included. Suitable comonomers include other dicarboxylic acids and glycols such as, but not limited to isophthalic acid (IPA), cyclohexanedimethanol and diethylene glycol (DEG).

DETAILED DESCRIPTION OF THE INVENTION

It has been found that copolyesters containing from about 5 to about 20 mole % of repeat units derived from naphthalenedicarboxylic acid and terephthalic acid and ethylene glycol may be produced with good clarity and color via the process of the present invention. Specifically the process of the present invention comprises polymerizing repeat units derived from an acid component comprising terephthalic acid and naphthalenedicarboxylic acid and at least one glycol in the presence of less than about 10 ppm sodium carbonate and between about 10 and about 60 ppm phosphorus.

The polyesters of the present invention are crystallizable polyester copolymer comprising repeat units derived from T, N and ethylene glycol. Preferably, said repeat units comprise about 1 to about 20 mole % naphthalenedicarboxylic acid, up to about 99 mole % terephthalic acid. The polyesters of the present invention are suitable for use in packaging, and particularly food packaging. Suitable polyesters may also comprise additional aromatic dicarboxylic acids, esters of dicarboxylic acids, glycols, and mixtures thereof. More preferably the polyesters are formed from terephthalic acid, dimethyl terephthalate, isophthalic acid, dimethyl isophthalate, dimethyl-2,6-naphthalenedicarboxylate, ethylene glycol, diethylene glycol, 1,4-cyclohexanedimethanol, 1,4-butanediol, and mixtures thereof.

The dicarboxylic acid component of the polyester comprises terepthalic acid, up to 20 mole % napthalenedicarboxylic acid and may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included are: phthalic acid, isophthalic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like.

The acid components may be added as an acid, diester or any other suitable form which will generate the desired repeat units.

The glycol component may also optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

In the first stage of the melt-phase process, a mixture of polyester monomer (diglycol esters of dicarboxylic acids) and oligomers are produced by conventional, well-known processes. The ester exchange or esterification reaction is conducted at a temperature between about 220° C. to about 250° C. and a pressure of about 0 to about 20 psig in the presence of suitable ester exchange catalysts such as lithium, magnesium, calcium, manganese, cobalt and zinc, or esterification catalysts such as hydrogen or titanium suitable forms of which are generally known in the art. The catalysts can be used alone or in combination. Preferably the total amount of catalyst is less than about 100 on an elemental basis Suitable colorants may also be added at this point. Blue and red colorants or toners are conventionally added to control the final color of the polyester. Preferably the concentration of each colorant added is less than about 10 ppm each. The reaction is conducted for about 1 to about 4 hours. It should be understood that generally the lower the reaction temperature, the longer the reaction will have to be conducted.

At the end of the esterification, greater than about 90% conversion and preferably greater than about 95% conversion less than about 10 ppm of sodium carbonate and between about 10 and about 60 ppm phosphorus is added. Suitable forms of sodium carbonate and phosphorus, including mixtures of the two, are well known in the art. Generally a polycondensation catalyst is added. Suitable polycondensation catalysts include salts of titanium, gallium, germanium, tin, antimony and lead, preferably antimony or germanium or a mixture thereof. Preferably the amount of catalyst added is between about 90 and 150 ppm when germanium or antimony is used. Suitable forms such as, but not limited to antimony oxide are well known in the art. The first polymerization reaction is conducted at a temperature less than about 280° C., and preferably between about 240° C. and 280° C. at a pressure sufficient to aid in removing undesirable reaction products such as ethylene glycol. The monomer and oligomer mixture is typically produced continuously in a series of one or more reactors operating at elevated temperature and pressures at one atmosphere or greater. Alternately, the monomer and oligomer mixture could be produced in one or more batch reactors.

Next, the mixture of polyester monomer and oligomers undergoes melt-phase polycondensation to produce a low molecular weight precursor polymer. The precursor is produced in a series of one or more reactors operating at elevated temperatures. To facilitate removal of excess glycols, water, alcohols, aldehydes, and other reaction products, the polycondensation reactors are run under a vacuum or purged with an inert gas. Inert gas is any gas which does not cause unwanted reaction or product characteristics. Suitable gases include, but are not limited to $CO_2$, argon, helium and nitrogen.

Temperatures for this step are generally between about 240° C. to about 280° C. and a pressure between about 0 and 2 mm Hg. Once the desired inherent viscosity is reached, the polymer is pelletized and may either be kept dry or dried. Precursor I.V. is generally below about 0.7 to maintain good color. The target I.V. is generally selected to balance good color and minimize the amount of solid stating which is required. Inherent viscosity (I.V.) was measured at 25° C. using 0.50 grams of polymer per 100 ml of a solvent consisting of 60% by weight phenol and 40% by weight tetrachloroethane.

We have surprisingly found that copolyesters comprising between about 5 and about 20 mol % N and having good color may be produced by adding a small amount of sodium carbonate and controlling the metal concentration (manganese, titanium, phosphorus and/or antimony) in the polymer. The good color achieved was particularly surprising because sodium carbonate, which is known to detrimentally effect color, was also added. In general one measurement of color in polyester is $L^*$, which is a measure of brightness (black-white). Copolyesters of the present invention generally display $L^*$ greater than about 55. Copolyesters of the same monomer composition but having higher levels of sodium carbonate and red/blue colorants displayed $L^*$ less than 50, and generally between about 45–50 (which is noticeably darker than an $L^*$ of 55). Clearly, levels of sodium and red/blue colorants above those recited in the present invention are not desirable.

The pelletized polymer may be blown dry immediately after pelletization, boxed and kept dry in order to avoid an additional drying step as disclosed in U.S. Pat. No. 5,663,290, incorporated herein by reference, or it may be dried. Suitable drying conditions are disclosed in U.S. Pat. Nos. 3,960,817 and 4,963,644, incorporated herein by reference, and include a preliminary drying step below the glass transition of the copolyester and preferably between about 70° C. and 80° C., until the pellets are dry to the touch. A light vacuum and/or a inert gas purge may also be used to facilitate drying.

Once the pellets are dry, they may be crystallized at a temperature between about 140° C. to about 200° C. for about 10 hours. After crystallization is completed, the molecular weight of the pellets may be further increased by "solid stating". During solid stating pellets are heat treated in the presence of an inert gas to remove unwanted volatiles and increase molecular weight. Solid stating conditions are well known, such as those disclosed in U.S. Pat. No. 4,064,112, which is incorporated herein by reference. Suitable solid stating conditions for the polyesters of the present invention include temperatures between about 195° C. to about 225° C. and residence times sufficient to produce an I.V. of greater than about 0.70 and preferably greater than about 0.75 is used. Surprisingly, the copolymers of the present invention displayed very good clarity and color.

The copolymers of this invention serve as excellent starting materials for the production of moldings of all types by extrusion or injection molding. Specific applications include various packaging applications such as thermoformed or injection molded trays, lids and cups; injection stretch blow-molded bottles, film and sheet; extrusion blow-molded bottles and multilayer articles. Examples of package contents include, but are not limited to, food, beverages, and cosmetics.

Many other ingredients can be added to the compositions of the present invention to enhance the performance properties of the blends. For example, crystallization aids, impact modifiers, surface lubricants, denesting agents, stabilizers, antioxidants, ultraviolet light absorbing agents, metal deactivators, colorants such as toners, titanium dioxide and carbon black, nucleating agents such as polyethylene and polypropylene, phosphate stabilizers, fillers, and the like, can be included herein. All of these additives and the use thereof are well known in the art and do not require extensive discussions. Therefore, it should be understood that any of these compounds can be used, either alone or in combination, so long as they do not hinder the present invention from accomplishing its objectives.

Following are specific examples of the melt-phase polymerization producing good $L^*$ color polymer, the melt-phase polymerization producing poor $L^*$ color polymer, the solid-phase crystallization, and the solid-state polymerization of a 10 mole % N copolymer.

EXAMPLE 1

At a reactor heating medium temperature of 195° C. and reactor pressure of 0 psig, 355 lbs dimethyl terephthalate (DMT), 52 lbs 2,6-napthtalene dicarboxylate (DMN), 214 lbs of ethylene glycol, 18 grams acetyl triisopropyl titanate (ATIP), 43 grams manganese acetate, 0.6 grams blue colorant, and 0.4 grams red colorant are charged. The reactor contents are then agitated. When all materials have been charged, the reactor heating medium temperature is raised to 240° C. at a rate of 0.9 C./min and the reactor pressure is raised to 5 psig to begin the ester exchange reaction. When the temperature of the reactor contents reached 235° C., the contents are held for 2 hours. When the 2 hours are complete, the vessel pressure is dropped to 0 psig, at which time 0.5 grams sodium carbonate and 32 grams phosphoric acid are added to the reactor contents. Approximately 10 minutes after adding the sodium carbonate and phosphoric acid, 30 grams antimony oxide is added to the reactor. The pressure in the reactor is then dropped to 40 mm Hg at a rate of 23 mm Hg/min and the reactor heating medium temperature is raised to 275° C. at a rate of 0.9 C./min to begin pre-polymerization. When the temperature of the reactor contents ceases to rise, the reactor pressure is raised to 0 psig and the reactor contents are transferred to a second reactor for further polymerization. In the second reactor, the pressure is controlled at 0.5 mm Hg and the reactor heating medium temperature is controlled at 275° C. Material is held in the second reactor at these conditions until target inherent viscosity (IV) is reached. When target IV is reached, the polymer is then extruded through a rod bath and pelletized. Resulting inherent viscosities for batches produced under this procedure were 0.60–0.66. Resulting metal content in batches produced under this procedure were 13 ppm titanium, 55 ppm manganese, 42 ppm phosphorus, and 110 ppm antimony. Typical color values for material produced under this procedure were $L^*>55$, $a^*$ between −2 and 1, and $b^*$ between 0 and 2.

EXAMPLE 2

At a reactor heating medium temperature of 195° C. and reactor pressure of 0 psig, 355 lbs DMT, 52 lbs DMN, 252 lbs of ethylene glycol, 21 grams acetyl triisopropyl titanate (ATIP), 47 grams manganese acetate, 0.7 grams blue colorant, and 0.5 grams red colorant are charged. The reactor contents are then agitated. When all materials have been charged, the reactor heating medium temperature is raised to 235° C. at a rate of 0.9 C./min and the reactor pressure is raised to 5 psig to begin the ester exchange reaction. When the temperature of the reactor contents reached 230° C., the contents are held for 2 hours. When the 2 hours are complete, the vessel pressure is dropped to 0 psig, at which time 1.2 grams sodium carbonate and 32 grams phosphoric acid are added to the reactor contents. Approximately 10 minutes after adding the sodium carbonate and phosphoric acid, 33 grams antimony oxide is added to the reactor. The pressure in the reactor is then dropped to 40 mm Hg at a rate of 23 mm Hg/min and the reactor heating medium temperature is raised to 275° C. at a rate of 0.9 C./min to begin pre-polymerization. When the temperature of the reactor contents ceases to rise, the reactor pressure is raised to 0 psig and the reactor contents are transferred to a second reactor for further polymerization. In the second reactor, the pressure is controlled at 0.5 mm Hg and the reactor heating medium temperature is controlled at 275° C. Material is held in the second reactor at these conditions until target inherent viscosity (IV) is reached. When target IV is reached, the polymer is then extruded through a rod bath and pelletized. Resulting inherent viscosities for batches produced under this procedure were 0.67–0.68. Resulting metal contents in batches produced under this procedure were 16 ppm titanium, 62 ppm manganese, 42 ppm phosphorus, and 125 ppm antimony. Typical color values for material produced at these conditions were $L^* < 50$, $a^*$ between $-1$ and 2, and $b^*$ between 1 and 4.

EXAMPLE 3

Polymer produced according to procedure outlined in Example 1 was then crystallized in a tumble dryer. Polymer pellets are charged to a dryer at which time a vacuum is pulled on the dryer, a nitrogen purge of 4 scfm is started, and the heating medium on the dryer is raised to 75° C. The pellets are tumble dried at 75° C. until they are dry to the touch. When pellets are dry, the vacuum is discontinued and the heating medium temperature is raised to 150° C. Pellets are held at 150° C. until they are crystallized.

EXAMPLE 4

Polymer produced according to procedure outlined in Example 1 was then solid-stated in a tumble dryer. Polymer pellets are charged to a dryer at which time a vacuum is pulled on the dryer, a nitrogen purge of 4 scfm is started, and the heating medium on the dryer is raised to 75° C. The pellets are tumble dried at 75° C. until they are dry to the touch. When pellets are dry, the vacuum is discontinued and the heating medium temperature is raised to 150° C. Pellets are held at 150° C. until they are crystallized. When pellets are crystallized, the heating medium temperature is raised to 195° C. in 5° C. increments every half-hour. The pellets are then sampled until target IV is reached. If necessary, the solid-stating temperature of 195° C. can be raised in small increments if the IV build-up of the pellets begins to level off. Increasing the temperature will help to further increase the pellet IV.

We claim:

1. A process for producing a copolyester having improved brightness comprising polymerizing repeat units derived from an acid component comprising terephthalic acid and naphthalenedicarboxylic acid and at least one glycol in the presence of at least one esterification and/or polycondensation catalyst and less than about 10 ppm sodium carbonate and between about 10 and about 60 ppm phosphorus.

2. The process of claim 1 wherein said repeat units comprise about 1 to about 20 mole % naphthalenedicarboxylic acid, and no more than about 99 mole % terephthalic acid.

3. The process of claim 1 wherein said at least one glycol comprises ethylene glycol.

4. The process of claim 2 wherein said residues from naphthalenedicarboxylic acid comprise about 5 to about 20 mole % of said acid component.

5. The process of claim 1 wherein said acid component further comprises up to about 15 mole percent of at least one additional dicarboxylic acids.

* * * * *